United States Patent
Wang

(10) Patent No.: US 11,957,252 B2
(45) Date of Patent: Apr. 16, 2024

(54) FOAM PAD STRUCTURE HAVING PROTECTIVE FILM

(71) Applicant: Hung Ya Wang, Taichung (TW)

(72) Inventor: Hung Ya Wang, Taichung (TW)

(*) Notice: Subject to any disclaimer, the term of this patent is extended or adjusted under 35 U.S.C. 154(b) by 328 days.

(21) Appl. No.: 17/487,218

(22) Filed: Sep. 28, 2021

(65) Prior Publication Data
US 2023/0102636 A1 Mar. 30, 2023

(51) Int. Cl.
| | |
|---|---|
| *B32B 5/18* | (2006.01) |
| *A47C 27/00* | (2006.01) |
| *A47C 27/15* | (2006.01) |
| *A63B 21/00* | (2006.01) |
| *B32B 38/00* | (2006.01) |
| *C09D 11/10* | (2014.01) |

(Continued)

(52) U.S. Cl.
CPC ............ *A47C 27/15* (2013.01); *A47C 27/008* (2013.01); *A63B 21/4037* (2015.10); *B32B 38/145* (2013.01); *C09D 11/10* (2013.01); *C09D 11/102* (2013.01); *B32B 5/18* (2013.01); *B32B 2037/1215* (2013.01); *B32B 2037/1223* (2013.01); *B32B 2266/0235* (2013.01); *B32B 2305/022* (2013.01); *B32B 2451/00* (2013.01)

(58) Field of Classification Search
CPC ....... A47C 27/008; A47C 27/14; A47C 27/15; A63B 21/4037; B32B 5/18; B32B 7/12; B32B 27/065; B32B 27/304; B32B 27/306; B32B 27/32; B32B 27/40; B32B 37/12; B32B 37/1207; B32B 2037/1215; B32B 2037/1223; B32B 2037/1276; B32B 38/14; B32B 38/145; B32B 2255/102; B32B 2255/26; B32B 2255/28; B32B 2266/0207; B32B 2266/0214; B32B 2266/0221; B32B 2266/0235; B32B 2266/0242; B32B 2266/025; B32B 2266/0278; B32B 2274/00; B32B 2305/022; B32B 2307/402; B32B 2307/4023; B32B 2307/4026; B32B 2451/00; B32B 2471/04; C09D 11/10; C09D 11/102; C09D 11/34; C09D 175/04
See application file for complete search history.

(56) References Cited

U.S. PATENT DOCUMENTS

| | | | |
|---|---|---|---|
| 9,738,059 B2 * | 8/2017 | Hing | B32B 37/12 |
| 2014/0259399 A1 * | 9/2014 | Tsai | A63B 21/4037 |
| | | | 5/420 |

FOREIGN PATENT DOCUMENTS

| | | | |
|---|---|---|---|
| TW | 309471 B | * | 7/1997 |
| TW | I242491 B | | 11/2005 |
| TW | I309471 B | | 5/2009 |

* cited by examiner

*Primary Examiner* — Michael A Tolin
(74) *Attorney, Agent, or Firm* — Rosenberg, Klein & Lee

(57) ABSTRACT

A foam pad structure having a protective film includes a substrate layer, a hot glue layer, a printed pattern layer, and an adhesive film. The substrate layer is made of a foam material. The substrate layer has two surfaces arranged oppositely on its upper and lower sides. The hot glue layer is coated on at least one of the two surfaces of the substrate layer. The hot glue layer has an adhesive surface facing away from the substrate layer. The printed pattern layer is composed of a pigment containing the same composition as the hot glue layer. The printed pattern layer is printed on the adhesive surface of the hot glue layer. The hot glue layer and the printed pattern layer are melted between the substrate layer and the adhesive film.

7 Claims, 4 Drawing Sheets

(51) Int. Cl.
*C09D 11/102* (2014.01)
*B32B 37/12* (2006.01)

FOAM PAD STRUCTURE HAVING PROTECTIVE FILM

FIELD OF THE INVENTION

The present invention relates to a foam pad structure, and more particularly to a foam pad structure having a protective film.

BACKGROUND OF THE INVENTION

In order to increase competitiveness in the market, foam pad manufacturers produce foam pads having different patterns to attract more purchase. The manufacturers take time to find a solution to print different patterns on the surfaces of the foam pads effectively and firmly and to prevent the patterns from being worn out after a long-term use. Taiwan Patent No. I242491 discloses a foam pad. The foam pad can be printed with ink patterns on its surface. However, the ink patterns are directly exposed to the outside. After a period of use, the ink patterns on the foam pad are often worn out due to friction between the ink patterns and the outside. Besides, it is easy to accumulate dirt on the worn part of the foam pad, which will affect the appearance of the foam pad.

Taiwan Patent Publication No. 309471 discloses another foam pad. A transparent hot glue layer is adhered to the surface of the foam pad, and then a layer of ink pattern is printed. Finally, an adhesive film coated with the same transparent hot glue layer is adhered. Through the two transparent hot glue layers, the foam pad and the adhesive film are bonded to each other to have an ink pattern protected by the adhesive film.

The foam pad and the adhesive film are formed with an ink pattern protected by the adhesive film by bonding two transparent hot melt adhesive layers to each other, thereby protecting the ink pattern from direct contact with the outside and causing the pattern to wear. This protects the ink pattern from direct contact with the outside to wear the pattern.

However, the ink pattern composed of ink will hinder the combination of the two transparent hot glue layers, affecting the bonding strength between the foam pad and the adhesive film.

SUMMARY OF THE INVENTION

The primary object of the present invention is to provide a foam pad structure having a protective film. The pigment of a printed pattern layer contains the same composition as a hot glue layer, so that the hot glue layer and the printed pattern layer have the same physical property to improve their bonding strength. When an adhesive film is attached to the printed pattern layer by hot pressing, the pigment used in the printed pattern layer has the same composition as the hot glue layer to ensure that the adhesive film is directly, firmly adhered to the printed pattern layer.

In order to achieve the foregoing object, the present invention provides a foam pad structure having a protective film. The foam pad structure comprises a substrate layer, a hot glue layer, a printed pattern layer, and an adhesive film. The substrate layer is made of a foam material. The substrate layer has two surfaces arranged oppositely on its upper and lower sides. The hot glue layer is coated on at least one of the two surfaces of the substrate layer. The hot glue layer has an adhesive surface facing away from the substrate layer. The printed pattern layer is composed of a pigment containing a composition of the hot glue layer. The printed pattern layer is printed on the adhesive surface of the hot glue layer. The adhesive film is adhered to the printed pattern layer after being heated.

DETAILED DESCRIPTION OF THE PREFERRED EMBODIMENTS

Embodiments of the present invention will now be described, by way of example only, with reference to the accompanying drawings.

Figure 1:
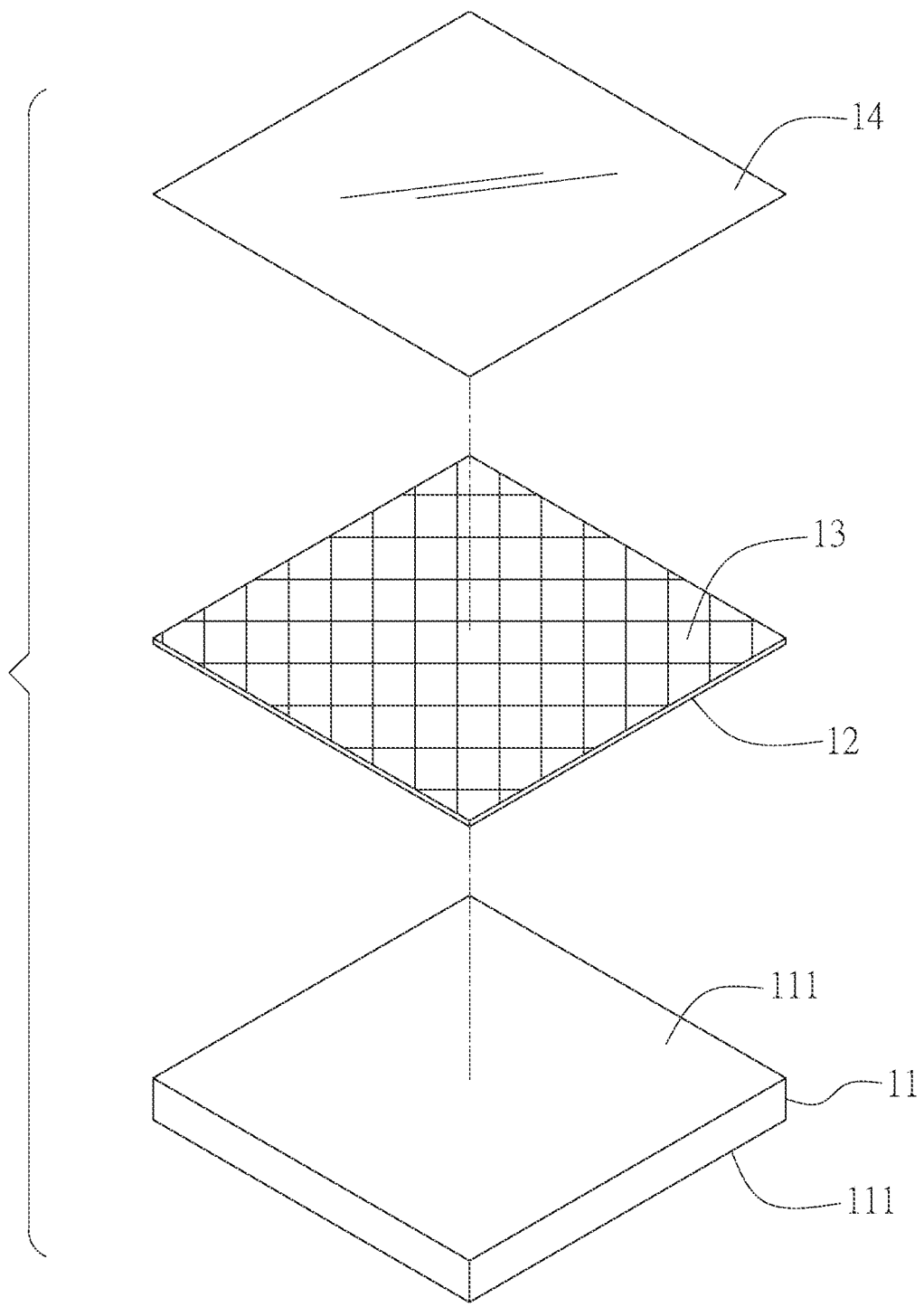
FIG. 1 is an exploded view according to a first embodiment of the present invention.
Figure 2:
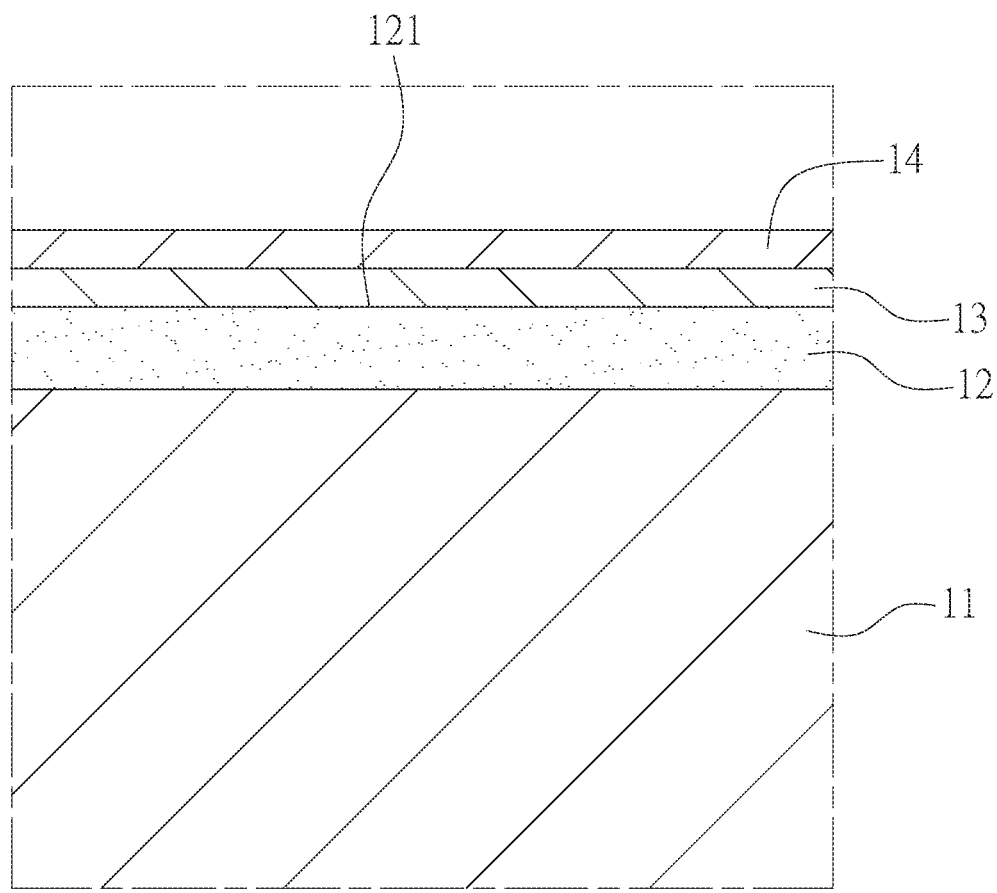
FIG. 2 is a cross-sectional view according to the first embodiment of the present invention.
Figure 3:
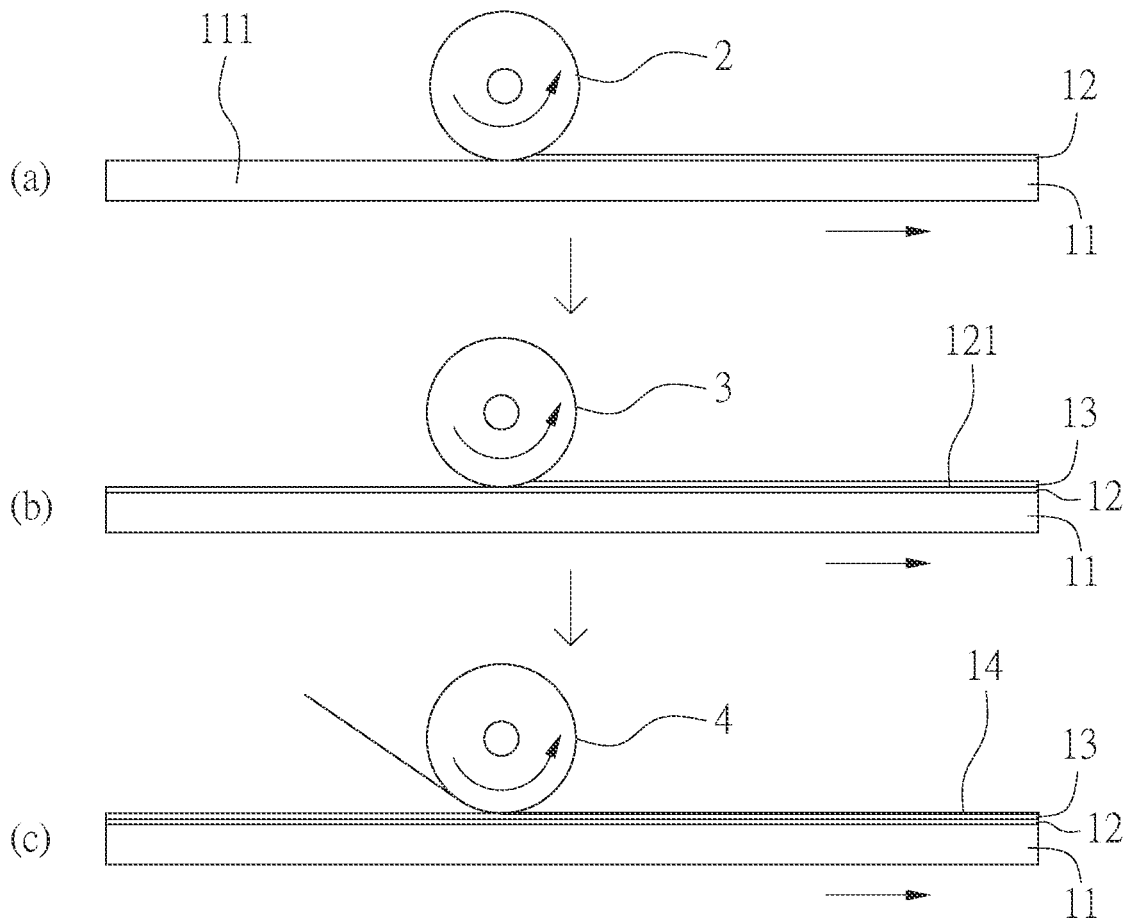
FIG. 3 is a schematic view showing the manufacturing process of the first embodiment of the present invention.

Referring to FIG. 1 through FIG. 3, a foam pad structure having a protective film according to a first embodiment of the present invention is mainly composed of a substrate layer 11, a hot glue layer 12, a printed pattern layer 13 and an adhesive film 14 laminated in sequence.

The substrate layer 11 has two surfaces 111 arranged oppositely on its upper and lower sides. The two surfaces 111 are flat. The substrate layer 11 is made of a foam material (not shown in the figures) to form a pad configuration. The foam material may be selected from ethylene vinyl acetate copolymer (EVA), polyvinyl chloride (PVC), polyethylene (PE), rubber, or the like.

The hot glue layer 12 is coated on at least one of the two surfaces 111 of the substrate layer 11. The hot glue layer 12 has an adhesive surface 121 facing away from the substrate layer 11. In this embodiment, the hot glue layer 12 is made of thermoplastic polyurethane (TPU). The hot glue layer 12 is in the form of a solid sheet at room temperature, and can be heated to a melting temperature to melt into a highly viscous glue.

The printed pattern layer 13 is formed by printing a specific pigment on the hot glue layer 12 by means of a printing method, such as a screen printing. The pigment constituting the printed pattern layer 13 contains the same composition, thermoplastic polyurethane (TPU), as the hot glue layer 12, so that the hot glue layer 12 and the printed pattern layer 13 have the same physical property to improve their bonding strength.

The adhesive film 14 is in the form of a transparent sheet, and is correspondingly attached to the printed pattern layer 13. In this embodiment, the adhesive film 14 has the same size as the printed pattern layer 13, thereby protecting the printed pattern layer 13 from being in direct contact with the outside. The adhesive film 14 may be made of polypropylene (PP), polyethylene (PE), thermoplastic polyurethane (TPU), high-density polyethylene (HDPE), or polyvinyl chloride (PVC).

FIG. 3 shows the steps of printing a pattern and adhering a film of the foam pad according to the first embodiment of the present invention. As shown in FIG. 3(a), first, a glue roller 2 is configured to apply liquid hot glue on the surface 111 of the substrate layer 11. After the liquid hot glue is dried about 80%, the hot glue layer 12 is formed.

As shown in FIG. 3(b), a printing roller 3 is configured to print a predetermined pattern on the hot glue layer 12 to form the printed pattern layer 13. Referring to FIG. 1 and FIG. 2, in the first embodiment of the present invention, the printed pattern layer 13 takes a diamond pattern as an example. The adhesive surface 121 of the hot glue layer 12 is fully printed with the printed pattern layer 13. Because the pigment constituting the printed pattern layer 13 contains the same composition, thermoplastic polyurethane (TPU), as the hot glue layer 12, the physical properties of the hot glue layer 12 and the printed pattern layer 13 are consistent, and the bonding strength can be improved.

As shown in FIG. 3(c), when the film is heated, a heated, a heated film roller 4 is configured to press the adhesive film 14 to be adhered to the printed pattern layer 13. The melting temperature of the adhesive film 14 is higher than the melting temperature of the hot glue layer 12 and the printed pattern layer 13. The heating temperature of the film roll 4 is controlled between the melting temperature of the adhesive film 14 and the melting temperature of the hot glue layer 12 and the printed pattern layer 13. When the film roller 4 rolls the adhesive film 14, the adhesive film 14 has not reached its melting temperature, and the hot glue layer 12 and the printed pattern layer 13 are melted to become gelatinous because the thermoplastic polyurethane (TPU) in them reaches the melting temperature. Thereby, the printed pattern layer 13 is tightly bonded with the hot glue layer 12. Since the pigment of the printed pattern layer 13 contains thermoplastic polyurethane (TPU), when it is in a molten state, the adhesive film 14 is also closely adhered to the printed pattern layer 13, so that the printed pattern layer 13 is protected by the adhesive film 14 without direct contact with the outside to result in abrasion, so as to form the foam pad structure of the present invention.

Through the above-mentioned manufacturing process, the printed pattern layer 13 has the same composition, thermoplastic polyurethane (TPU), as the hot glue layer 12, so that the printed pattern layer 13 and the hot glue layer 12 are gelatinous after being heated to the melting temperature. When the heated film roller 4 rolls the adhesive film 14, the adhesive film 14 is firmly bonded to the gelatinous printed pattern layer 13 and is firmly bonded to the surface 111 of the substrate layer 11 through the gelatinous hot glue layer 12, so that a printed pattern with a protective film is formed on the surface 111 of the substrate layer 11.

Figure 4:
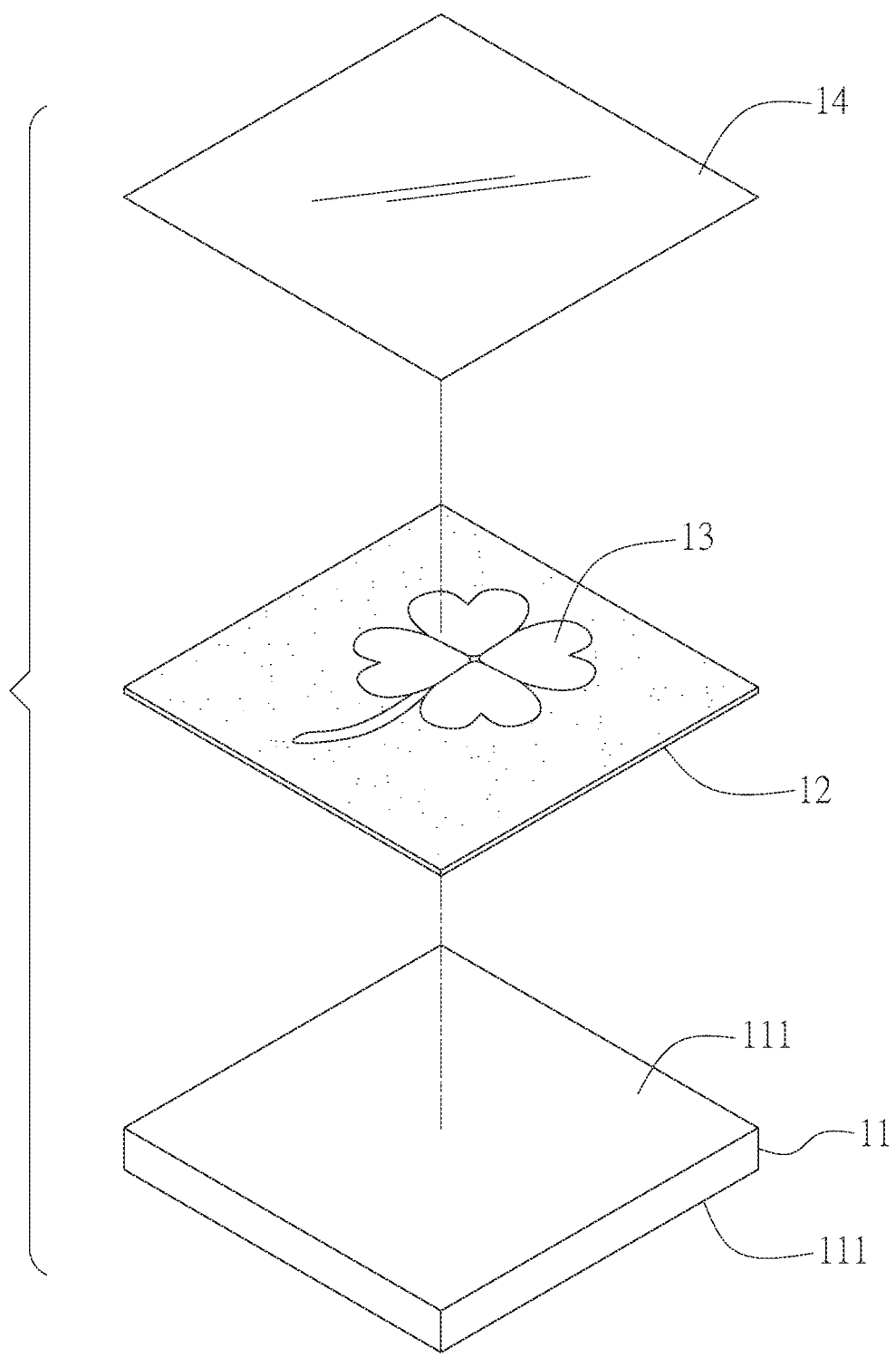
FIG. 4 is an exploded view according to a second embodiment of the present invention.

FIG. 4 illustrates a second embodiment of the present invention. The second embodiment is substantially similar to the first embodiment with the exceptions described hereinafter. In the second embodiment, the adhesive surface 121 of the hot glue layer 12 is partially printed with the printed pattern layer 13. As shown in FIG. 4, the printed pattern layer 13 takes a four-leaf clover pattern as an example. When the adhesive film 14 is heated and adhered to the printed pattern layer 13, the adhesive film 14 is attached to the printed pattern layer 13 and part of the adhesive surface 121, not covered by the printed pattern layer 13. Thus, the adhesive film 14 is adhered to both the hot glue layer 12 and the printed pattern layer 13 after being hot-pressed, so that the printed pattern layer 13 is protected by the adhesive film 14 without direct contact with the outside to result in abrasion. In the second embodiment of the present invention, the pigment constituting the printed pattern layer 13 contains the same composition, thermoplastic polyurethane (TPU), as the hot glue layer 12, so that the hot glue layer 12 and the printed pattern layer 13 have the same physical property to improve their bonding strength, and the adhesive film 14 is firmly bonded to the gelatinous printed pattern layer 13.

What is claimed is:

1. A foam pad structure, comprising:
    a substrate layer, made of a foam material, the substrate layer having two surfaces arranged oppositely on its upper and lower sides;
    a hot glue layer, coated on at least one of the two surfaces of the substrate layer, the hot glue layer having an adhesive surface facing away from the substrate layer;
    a printed pattern layer, composed of a pigment containing a composition of the hot glue layer, the printed pattern layer being printed on the adhesive surface of the hot glue layer; and
    an adhesive film adhered to the printed pattern layer.

2. The foam pad structure as claimed in claim 1, wherein the foam material is selected from the group consisting of ethylene vinyl acetate copolymer (EVA), polyvinyl chloride (PVC), polyethylene (PE), and rubber.

3. The foam pad structure as claimed in claim 1, wherein the hot glue layer is made of thermoplastic polyurethane (TPU).

4. The foam pad structure as claimed in claim 3, wherein the pigment of the printed pattern layer contains the same composition, thermoplastic polyurethane (TPU), as the hot glue layer.

5. The foam pad structure as claimed in claim 1, wherein the adhesive film is made of polypropylene (PP), polyethylene (PE), thermoplastic polyurethane (TPU), high-density polyethylene (HDPE), or polyvinyl chloride (PVC).

6. The foam pad structure as claimed in claim 1, wherein the adhesive surface of the hot glue layer is fully printed with the printed pattern layer, and the adhesive film is fully adhered to the printed pattern layer.

7. The foam pad structure as claimed in claim 1, wherein the adhesive surface of the hot glue layer is partially printed with the printed pattern layer, and the adhesive film is adhered to the printed pattern layer and part of the adhesive surface, not covered by the printed pattern layer.

\* \* \* \* \*